US007657357B2

(12) United States Patent
Matsuno

(10) Patent No.: US 7,657,357 B2
(45) Date of Patent: Feb. 2, 2010

(54) VEHICLE MOTION CONTROL DEVICE

(75) Inventor: Koji Matsuno, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1155 days.

(21) Appl. No.: 10/953,350

(22) Filed: Sep. 30, 2004

(65) Prior Publication Data

US 2005/0075771 A1 Apr. 7, 2005

(30) Foreign Application Priority Data

Oct. 7, 2003 (JP) .............................. 2003-348774

(51) Int. Cl.
*B60T 8/32* (2006.01)
(52) U.S. Cl. ............................ 701/70; 701/83; 701/89; 303/146
(58) Field of Classification Search ........................ None
See application file for complete search history.

(56) References Cited

U.S. PATENT DOCUMENTS

| 5,710,705 | A | | 1/1998 | Eckert |
| 5,742,917 | A | * | 4/1998 | Matsuno ........................ 701/69 |
| 5,826,951 | A | | 10/1998 | Sano |
| 6,094,614 | A | | 7/2000 | Hiwatashi |
| 6,442,469 | B1 | * | 8/2002 | Matsuno ........................ 701/70 |
| 2002/0052681 | A1 | | 5/2002 | Matsuno |

FOREIGN PATENT DOCUMENTS

| EP | 1 338 490 A2 | 8/2003 |
| JP | 11-59216 | 3/1999 |
| JP | 2002-120711 | 4/2002 |

OTHER PUBLICATIONS

Japanese Office Action dated Jul. 7, 2009.

* cited by examiner

*Primary Examiner*—Michael J. Zanelli
(74) *Attorney, Agent, or Firm*—McGinn IP Law Group PLLC

(57) ABSTRACT

A transfer clutch control units operates a second transfer clutch torque corresponding to a yaw moment out of the transfer clutch torque to be output to a transfer clutch drive unit by a second transfer clutch torque operational unit. The second transfer clutch torque operational unit operates a reference lateral acceleration from a lateral acceleration to be operated based on a linear vehicle motion model from a vehicle driving state and a preset coefficient according to the vehicle driving state, in addition to the yaw moment sensing the yaw rate and the yaw moment sensing the steering wheel angle, and operate the yaw moment corresponding to the deviation between the reference lateral acceleration and the actual lateral acceleration as a corrected value of the yaw moment. Not only a high μ road but also a low μ road, even abrupt change of road surfaces or the like can be consistently and optimally coped with in excellent response.

20 Claims, 8 Drawing Sheets

US 7,657,357 B2

VEHICLE MOTION CONTROL DEVICE

This application claims benefit of Japanese Application No. 2003-348774 filed on Oct. 7, 2003, the contents of which are incorporated by this reference.

BACKGROUND OF THE INVENTION

1. Field of the Invention

The present invention relates to a vehicle motion control device to control behaviors of a vehicle by operating a required yaw moment.

2. Description of the Related Art

Recently, a vehicle motion control device to control behaviors of a vehicle includes one to operate a yaw moment required for controlling the vehicle, and sets controllable variables according to the value of the operated yaw moment. Such a vehicle motion control device to perform the control according to the yaw moment, such as the vehicle motion control device employing the "steering angle feedforward+ yaw rate feedback" control, is effective for enhancement of maneuverability on a high μ road (which represents a road surface having a high coefficient of friction). On the other hand, when the vehicle is traveling on a low μ road (a low coefficient of friction), excessive turning moment is added to possibly promote spin trend of the vehicle.

Further, different from the above vehicle motion control device to perform the control according to the yaw moment, various kinds of vehicle motion control devices to control behaviors of the vehicle by setting the controllable variables according to the coefficient of friction μ on the road (hereinafter referred to as road friction μ) have been proposed such as those disclosed in Japanese Unexamined Patent Application Publication No. 11-59216.

The technology disclosed in the above-described Japanese Unexamined Patent Application Publication No. 11-59216 realizes optimum control not only on the high μ road, but also on the low μ road.

However, problems occur, in that responsiveness to estimate the road friction μ is delayed, and abrupt change of road surfaces or the like cannot be coped with in excellent response.

The present invention is achieved in light of the above circumstances.

SUMMARY OF THE INVENTION

Accordingly, it is an object of the present invention to provide a vehicle motion control device capable of consistently and optimally coping with not only the high μ road but also the low μ road, even abrupt change of road surfaces or the like in excellent response.

According to a preferred embodiment of the present invention, a vehicle motion control device comprises a controllable variable operational unit to operate the value of the yaw moment required for controlling and operate the controllable variables including at least the yaw moment, and a vehicle behavior control unit to control vehicle behaviors based on the controllable variables, wherein the controllable variable operational unit operates the reference lateral acceleration from at least the lateral acceleration to be operated based on a linear vehicle motion model from a driving state of the vehicle and a coefficient preset according to the driving state of the vehicle, and uses the difference between the reference lateral acceleration and the actual lateral acceleration for a correction value of the yaw moment.

The above and other objects, features and advantages of the invention will become more clearly understood from the following description referring to the accompanying drawings.

DETAILED DESCRIPTION OF THE PREFERRED EMBODIMENTS

An embodiment of the present invention will be described below with reference to FIGS. 1 to 9. In the embodiment of the present invention, a front and rear driving force distribution control unit (a transfer clutch control unit) to variably control the driving force distribution between front and rear wheels will be described as an example of a vehicle behavior control unit.

Figure 1:
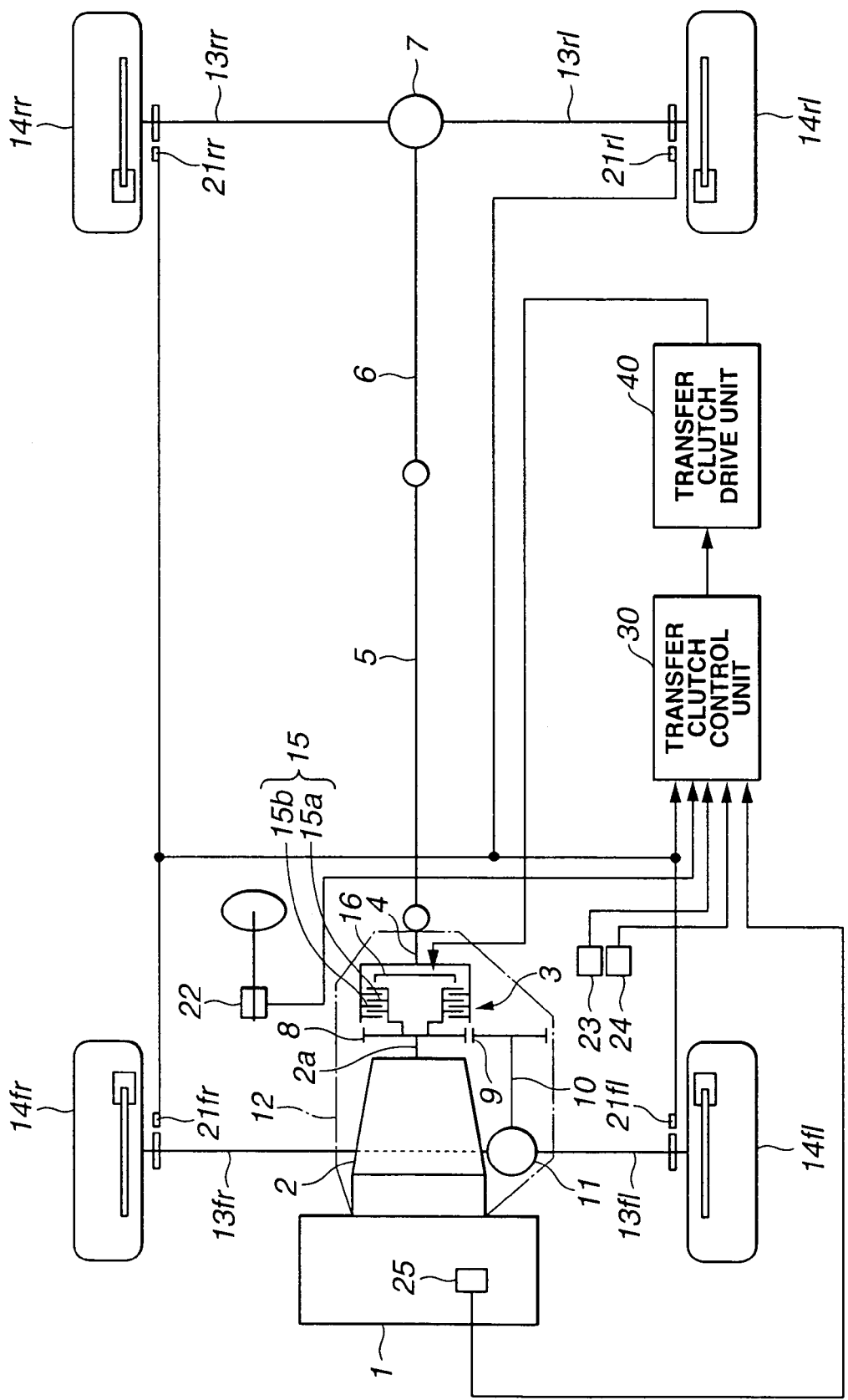
FIG. 1 is a schematic representation of a drive system of an entire vehicle.

In FIG. 1, reference numeral 1 denotes an engine disposed in a forward portion of the vehicle, and the output of the engine 1 is transmitted to an automatic transmission (shown including a torque converter and the like) 2 backward of the engine 1, then to a transfer 3 via a transmission output shaft 2a.

In addition, the driving force transmitted to the transfer 3 is input in a rear wheel final reduction gear unit 7 via a rear drive shaft 4, a propeller shaft 5, and a drive pinion shaft part 6, and input in a front wheel final reduction gear unit 11 via a reduction drive gear 8, a reduction driven gear 9, and a front drive shaft 10 forming the drive pinion shaft part. Here, the automatic transmission 2, the transfer 3, the front wheel final reduction gear unit 11 or the like are integrally disposed in a case 12.

Further, the driving force input in the rear wheel final reduction gear unit 7 is transmitted to a rear left wheel 14rl via a rear wheel left drive shaft 13rl, and to a rear right wheel 14rr via a rear wheel right drive shaft 13rr, respectively. The driving force input in the front wheel final reduction gear unit 11 is transmitted to a front left wheel 14fl via a front wheel left drive shaft 13fl, and to a front right wheel 14fr via a front wheel right drive shaft 13fr, respectively.

The transfer 3 comprises a wet-type multiple disk clutch (a transfer clutch) 15 as a variable torque transmitting clutch constituted by alternately overlapping a drive plate 15a provided on the reduction drive gear 8 side and a driven plate 15b provided on the rear drive shaft 4 side, and a transfer piston 16 to variably provide an engagement force (a transfer clutch torque) of the transfer clutch 15. Therefore, the vehicle realizes a four-wheel drive vehicle on the front engine front drive vehicle base (FF base) capable of varying the torque distribution ratio between the front wheel and the rear wheel between 100:0 and 50:50 by controlling the pressure by the transfer piston 16, and controlling the transfer clutch torque by the transfer clutch 15.

Further, the pressure of the transfer piston 16 is provided by a transfer clutch drive unit 40 to be constituted of a hydraulic circuit including a plurality of solenoid valves. A control signal to drive the transfer clutch drive unit 40 (an output signal according to the transfer clutch torque corresponding to the solenoid valve) is output from a transfer clutch control unit 30 which will be described below.

The vehicle has sensors to detect parameters required for the transfer clutch control to be performed by the transfer clutch control unit 30 as described below. In other words, wheel speeds ωfl, ωfr, ωrl and ωrr of wheels 14*fl*, 14*fr*, 14*rl* and 14*rr* are detected by wheel speed sensors 21*fl*, 21*fr*, 21*rl* and 21*rr*, a steering wheel angle θH is detected by a steering wheel angle sensor 22, an actual lateral acceleration ($d^2y/dt^2$) generated in the vehicle is detected by a lateral acceleration sensor 23, a yaw rate ν is detected by a yaw rate sensor 24, and a throttle opening θth of the engine 1 is detected by a throttle opening sensor 25. And these parameters are input in the transfer clutch control unit 30.

The transfer clutch control unit 30 functions as a controllable variable operational unit and a vehicle behavior control unit, operates a first transfer clutch torque T LSD1 sensing the throttle opening θth and the lateral acceleration ($d^2y/dt^2$) and a second transfer clutch torque T LSD2 sensing the yaw moment based on the above input signals. The transfer clutch control unit 30 adds the first transfer clutch torque T LSD1 to the second transfer clutch torque T LSD2 to obtain the final transfer clutch torque T LSD which is output to the transfer clutch drive unit 40.

Figure 2:
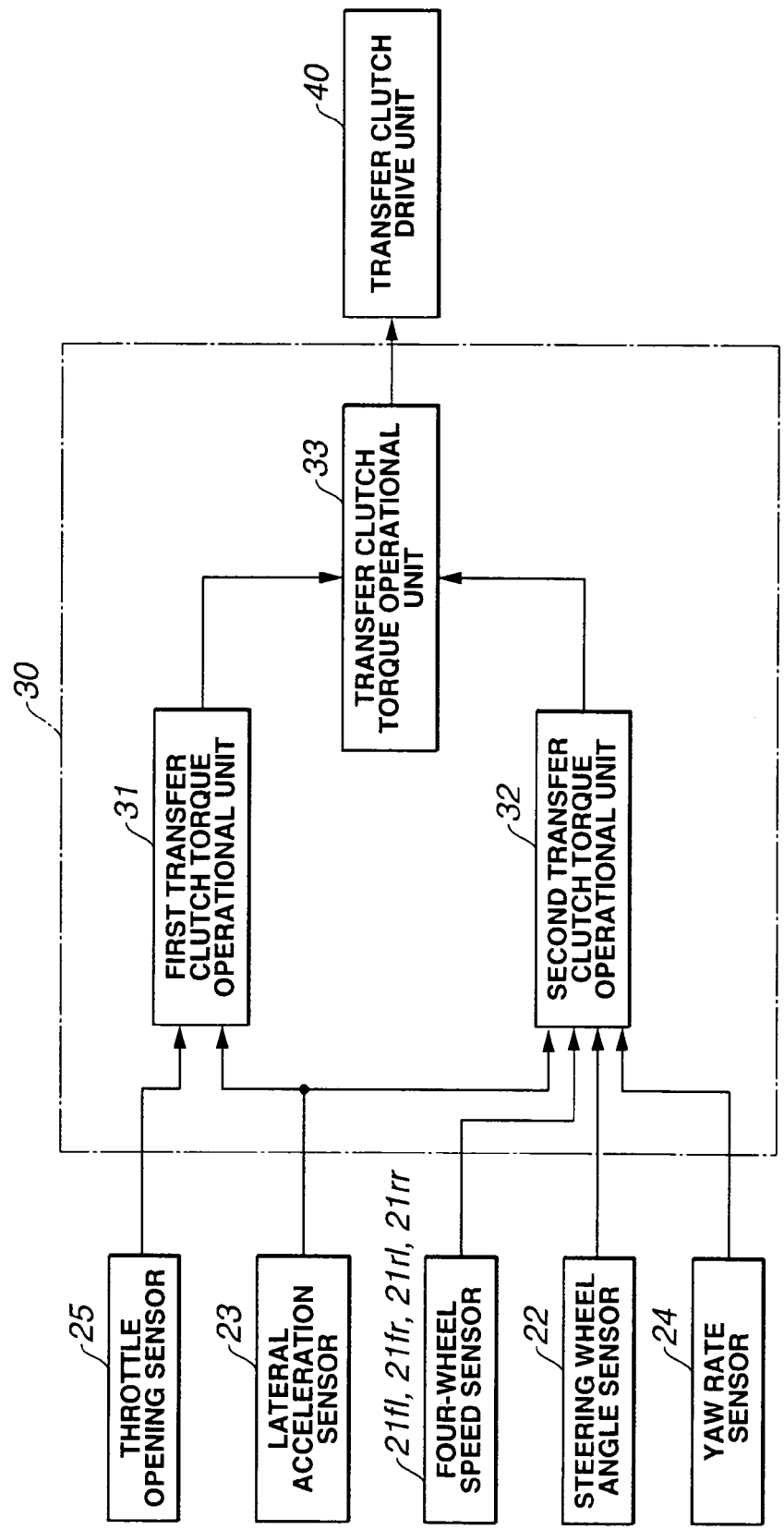
FIG. 2 is a functional block diagram of a transfer clutch control unit.

That is, as shown in FIG. 2, the transfer clutch control unit 30 mainly comprises a first transfer clutch torque operational unit 31, a second transfer clutch torque operational unit 32, and a transfer clutch torque operational unit 33.

In the first transfer clutch torque operational unit 31, the actual lateral acceleration ($d^2y/dt^2$) is input from the lateral acceleration sensor 23, and the throttle opening θth is input from the throttle opening sensor 25, respectively. The required first transfer clutch torque T LSD1 is set with reference to a map (for example, a map in FIG. 4) set by an experiment in advance, and output to the transfer clutch operational unit 33. The first transfer clutch torque T LSD1 may be corrected by the vehicle speed V or the like, and further output thereto.

In the second transfer clutch torque operational unit 32, the wheel speed ωfl, ωfr, ωrl and ωrr of the wheels 14*fl*, 14*fr*, 14*rl* and 14*rr* are input from the wheel speed sensors 21*fl*, 21*fr*, 21*rl* and 21*rr*, the steering wheel angle θH is input from the steering wheel angle sensor 22, the actual lateral acceleration ($d^2y/dt^2$) is input from the lateral acceleration sensor 23, and the yaw rate ν is input from the yaw rate sensor 24, respectively. Based on these input values, the second transfer clutch torque T LSD2 according to the yaw moment required for the control is operated, and output to the transfer clutch operational unit 33. The second transfer clutch torque operational unit 32 will be described below in detail.

In the transfer clutch torque operational unit 33, the first transfer clutch torque T LSD1 is input from the first transfer clutch torque operational unit 31, and the second transfer clutch torque T LSD2 is input from the second transfer clutch torque operational unit 32, respectively. By adding these torque values to each other, the final transfer clutch torque T LSD (=T LSD1+T LSD2) is operated, and output to the transfer clutch drive unit 40.

Next, the second transfer clutch torque operational unit 32 will be described in detail.

Figure 3:
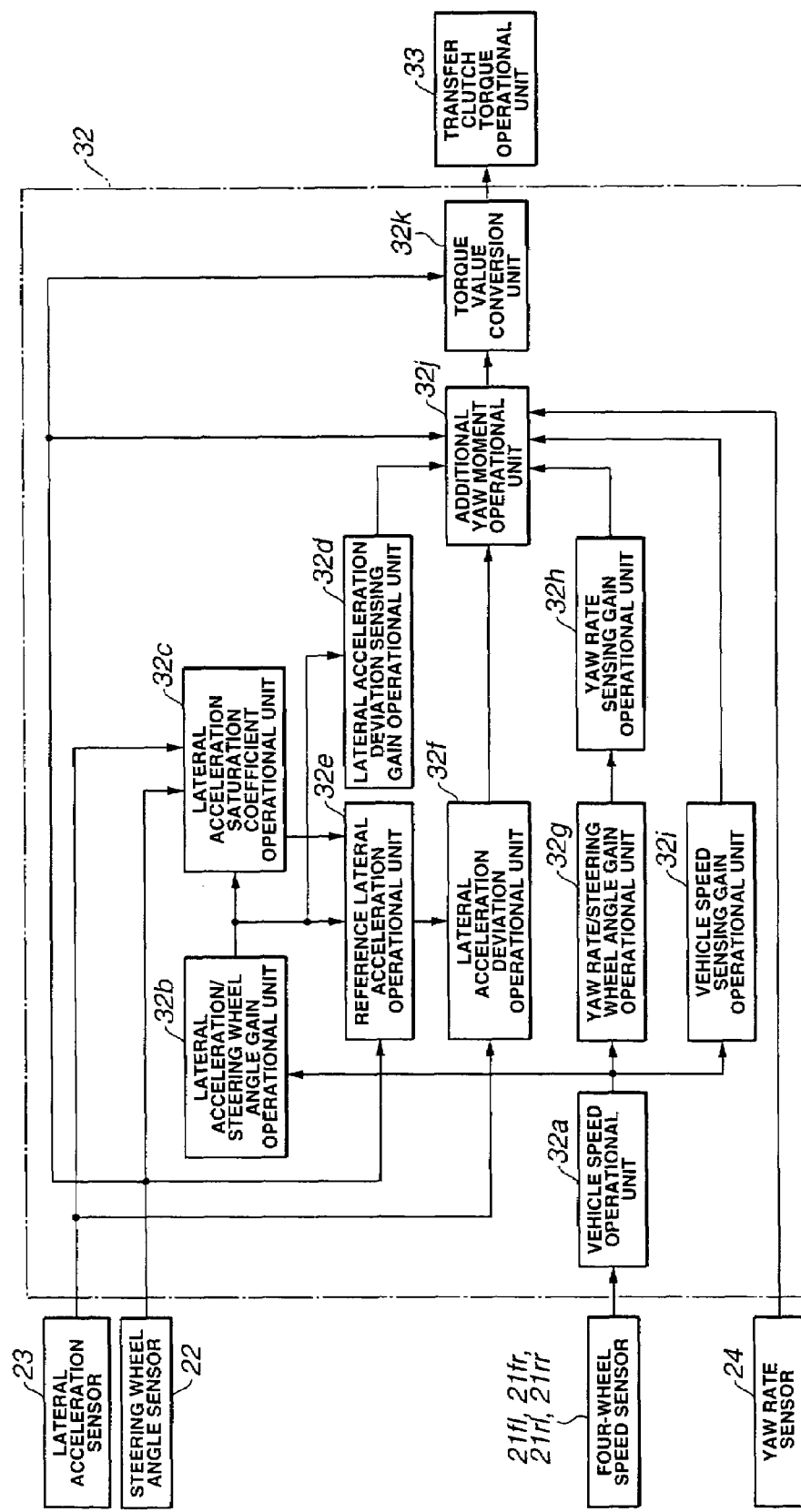
FIG. 3 is a functional block diagram of a second transfer clutch torque operational unit.
Figure 4:
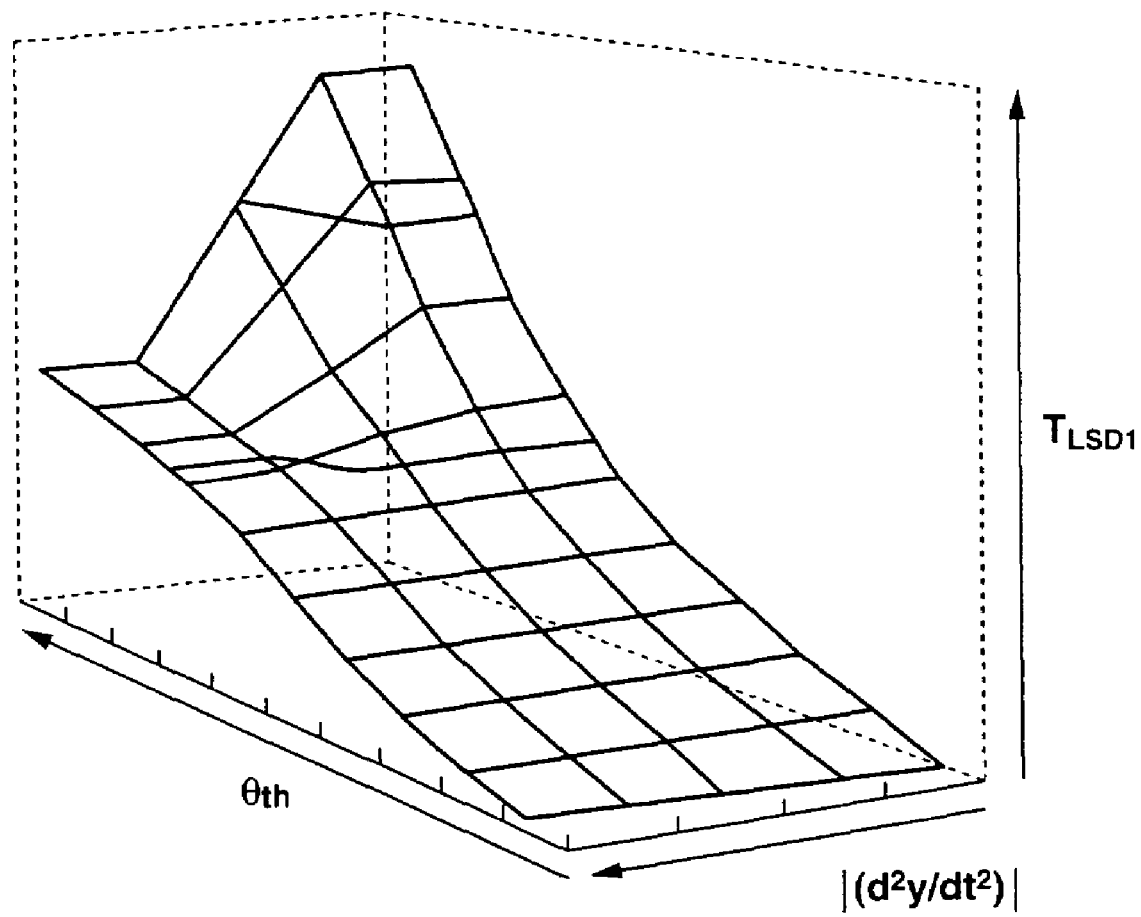
FIG. 4 is an operational map of a first transfer clutch torque.

As shown in FIG. 3, the second transfer clutch torque operational unit 32 mainly comprises a vehicle speed operational unit 32*a*, a lateral acceleration/steering wheel angle gain operational unit 32*b*, a lateral acceleration saturation coefficient operational unit 32*c*, a lateral acceleration deviation sensing gain operational unit 32*d*, a reference lateral acceleration operational unit 32*e*, a lateral acceleration deviation operational unit 32*f*, a yaw rate/steering wheel angle gain operational unit 32*g*, a yaw rate sensing gain operational unit 32*h*, a vehicle speed sensing gain operational unit 32*i*, an additional yaw moment operational unit 32*j*, and a torque value conversion unit 32*k*.

In the vehicle speed operational unit 32*a*, the wheel speed ωfl, ωfr, ωrl and ωrr of the wheels 14*fl*, 14*fr*, 14*rl* and 14*rr* are input from the wheel speed sensors of four wheels, i.e., the wheel speed sensors 21*fl*, 21*fr*, 21*rl* and 21*rr*. For example, by operating the average of the wheel speeds, the vehicle speed V (=(ωfl+ωfr+ωrl+ωrr)/4) is operated, and output to the lateral acceleration/steering wheel angle gain operational unit 32*b*, the yaw rate/steering wheel angle gain operational unit 32*g*, and the vehicle speed sensing gain operational unit 32*i*.

In the lateral acceleration/steering wheel angle gain operational unit 32*b*, the vehicle speed V is input from the vehicle speed operational unit 32*a*, the lateral acceleration/steering wheel angle gain Gy is operated by the formula (1), and output to the lateral acceleration saturation coefficient operational unit 32*c*, the lateral acceleration deviation sensing gain operational unit 32*d*, and the reference lateral acceleration operational unit 32*e*.

$$Gy=(1/(1+A \cdot V^2)) \cdot (V^2/L) \cdot (1/n) \tag{1}$$

where, A is a stability factor, L is a wheel base, and n is a steering gear ratio.

In the lateral acceleration saturation coefficient operational unit 32*c*, the steering wheel angle θH is input from the steering wheel angle sensor 22, the lateral acceleration ($d^2y/dt^2$) is input from the lateral acceleration sensor 23, and the lateral acceleration/steering wheel angle gain Gy is input from the lateral acceleration/steering wheel angle gain operational unit 32*b*, respectively.

Figure 5A:
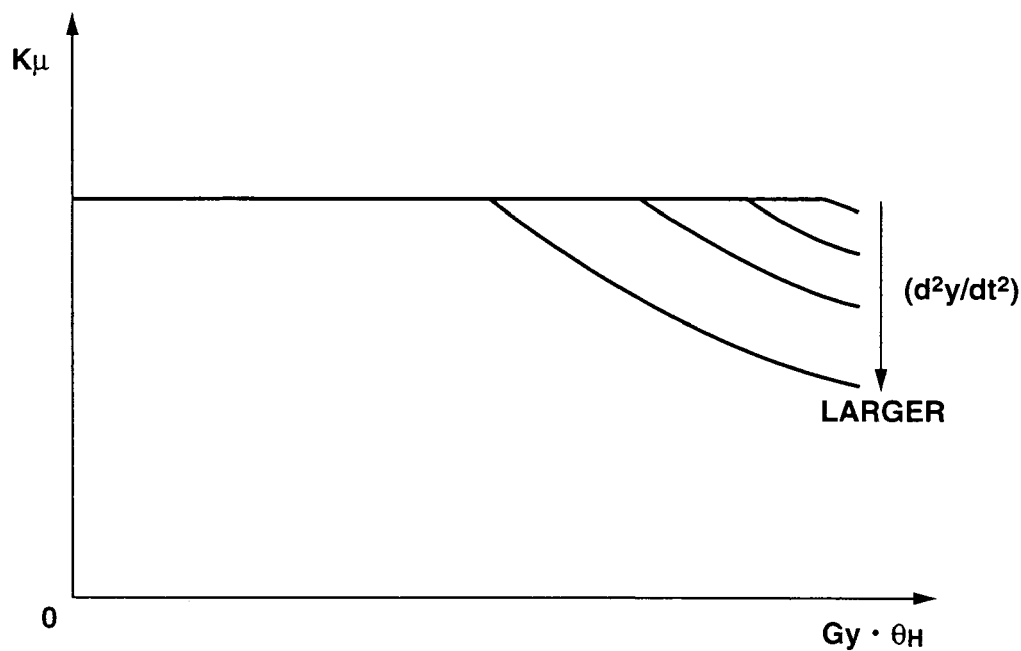
FIG. 5A is a characteristic representation of the lateral acceleration saturation coefficient.

The lateral acceleration saturation coefficient Kμ as a coefficient set in advance according to the driving state of the vehicle is obtained with reference to the map, and output to the reference lateral acceleration operational unit 32*e*. As shown in FIG. 5A, the map for obtaining the lateral acceleration saturation coefficient Kμ is set in advance according to the value (Gy·θH) of the lateral acceleration/steering wheel angle gain Gy multiplied by the steering wheel angle θH, and the lateral acceleration ($d^2y/dt^2$), and the lateral acceleration saturation coefficient Kμ is set to be a smaller value as the lateral acceleration ($d^2y/dt^2$) becomes larger when the steering wheel angle θH is not less than a predetermined value.

Figure 5B:
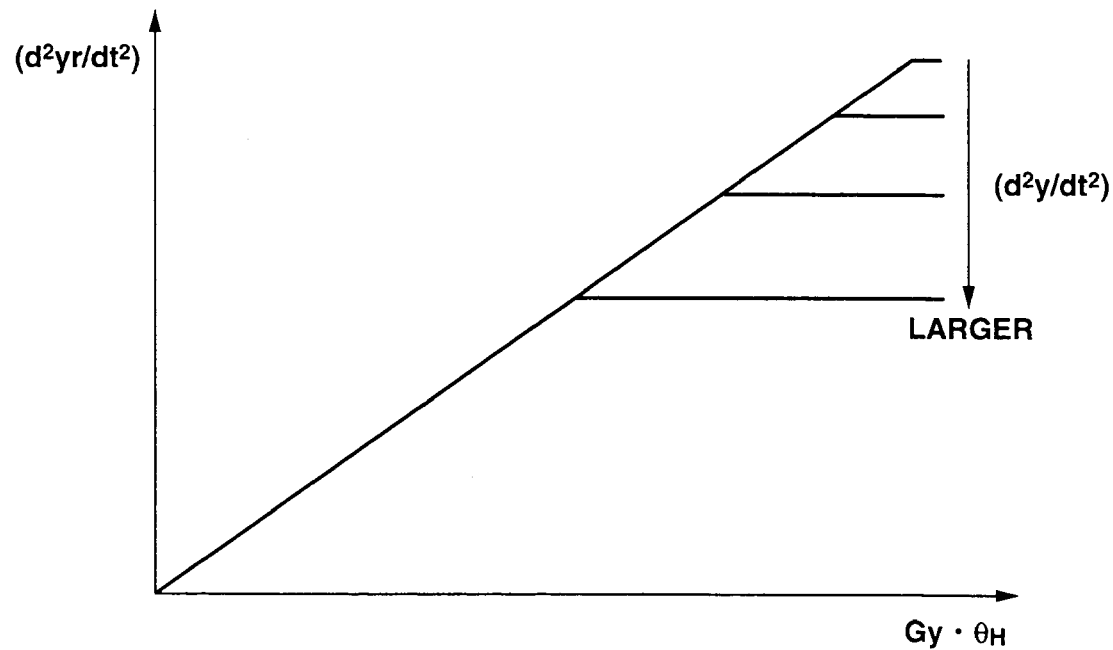
FIG. 5B is a characteristic representation of the reference lateral acceleration.

This means that the lateral acceleration ($d^2y/dt^2$) becomes larger on a higher μroad when Gy·θH is large. On the other hand, on a lower μ road, the lateral acceleration ($d^2y/dt^2$) is hardly generated. Therefore, as shown in FIG. 5B, the value of the reference lateral acceleration ($d^2yr/dt^2$) which will be described below is set to be a small value when it seems that Gy·θH is large, and the lateral acceleration ($d^2y/dt^2$) is large with the high μroad, and the correction to the additional yaw moment Mzθ becomes small.

In the lateral acceleration deviation sensing gain operational unit 32*d*, the lateral acceleration/steering wheel angle gain Gy is input from the lateral acceleration/steering wheel angle gain operational unit 32b, the lateral acceleration deviation sensing gain Ky is operated by the formula (2) below, and output to the additional yaw moment operational unit 32j.

$$Ky = K\theta/Gy \qquad (2)$$

where Kθ is the steering angle sensing gain, and operated by the formula (3) below.

$$K\theta = (Lf \cdot Kf)/n \qquad (3)$$

where, Lf is the distance between the front axle and the center of gravity, and Kf is the equivalent cornering power of the front axle.

In other words, the above formula (2) indicates that the lateral acceleration deviation sensing gain Ky is a setting target (a maximum value), and there is a case in which the additional yaw moment Mzθ (a steady value) becomes 0 in a state where steering is completely out of order at a very low μroad (v=0, (d²y/dt²)=0).

In the reference lateral acceleration operational unit 32e, the steering wheel angle θH is input from the steering wheel angle sensor 22, the lateral acceleration/steering wheel angle gain Gy is input from the lateral acceleration/steering wheel angle gain operational unit 32b, and the lateral acceleration saturation coefficient Kμ is input from the lateral acceleration saturation coefficient operational unit 32c, respectively. Then, the reference lateral acceleration (d²yr/dt²) is operated by the formula (4) below, and output to the lateral acceleration deviation operational unit 32f.

$$(d^2yr/dt^2) = K\mu \cdot Gy \cdot (1/(1+Ty \cdot s)) \cdot \theta H \qquad (4)$$

where, s is the differential operator, Ty is the primary delay time constant of the lateral acceleration, and this primary delay time constant Ty is calculated by the formula (5) below, with Iz being the yaw inertia moment, and Kr is the equivalent cornering power of the front axle.

$$Ty = Iz/(L \cdot Kr) \qquad (5)$$

In the lateral acceleration deviation operational unit 32f, the lateral acceleration (d²y/dt²) is input from the lateral acceleration sensor 23, the reference lateral acceleration (d²yr/dt²) is input from the reference lateral acceleration operational unit 32e, the lateral acceleration deviation (d²ye/dt²) is operated by the formula (6) below, and output to the additional yaw moment operational unit 32j.

$$(d^2ye/dt^2) = (d^2y/dt^2) - (d^2yr/dt^2) \qquad (6)$$

In the yaw rate/steering wheel angle gain operational unit 32g, the vehicle speed V is input from the vehicle speed operational unit 32a, the yaw rate/steering wheel angle gain Gv is operated by the formula (7) below, and output to the yaw rate sensing gain operational unit 32h.

$$Gv = (1/(1+A \cdot V^2)) \cdot (V/L) \cdot (1/n) \qquad (7)$$

In the yaw rate sensing gain operational unit 32h, the yaw rate/steering wheel angle gain Gv is input from the yaw rate/steering wheel angle gain operational unit 32g, and the yaw rate sensing gain Kv is operated by the formula (8) below, considering a case that, for example, the additional yaw moment Mzθ (a steady value) becomes 0 in the grip traveling ((d²ye/dt²)=0). This yaw rate sensing gain Kv is output to the additional yaw moment operational unit 32j.

$$Kv = K\theta/Gv \qquad (8)$$

Figure 6:
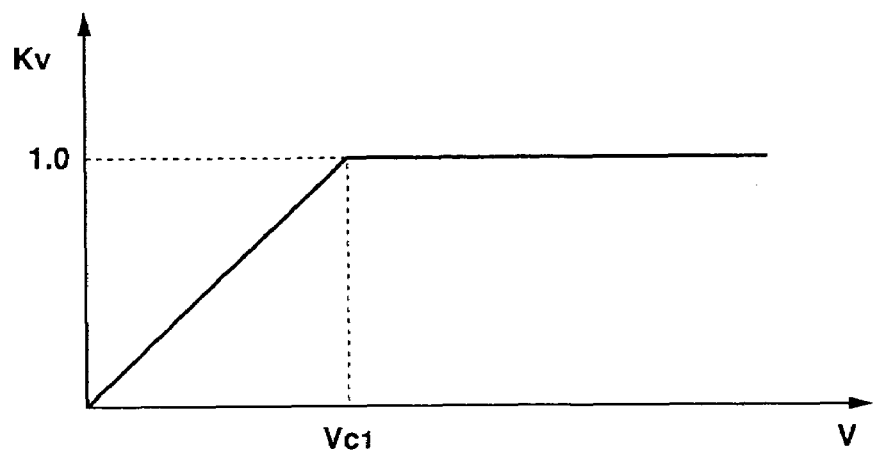
FIG. 6 is a characteristic map of a vehicle speed sensing gain.

In the vehicle speed sensing gain operational unit 32i, the vehicle speed V is input from the vehicle speed operational unit 32a, and to avoid any unnecessary additional yaw moment Mzθ in a low-speed range, for example, the vehicle speed sensing gain Kv is obtained from a preset characteristic map shown in FIG. 6, and output to the additional yaw moment operational unit 32j. In FIG. 6, Vc1 is, for example, 40 km/h.

In the additional yaw moment operational unit 32j, the steering wheel angle θH is input from the steering wheel angle sensor 22, the yaw rate v is input from the yaw rate sensor 24, the lateral acceleration deviation sensing gain Ky is input from the lateral acceleration deviation sensing gain operational unit 32d, the lateral acceleration deviation (d²ye/dt²) is input from the lateral acceleration deviation operational unit 32f, the yaw rate sensing gain Kv is input from the yaw rate sensing gain operational unit 32h, and the vehicle speed sensing gain Kv is input from the vehicle speed sensing gain operational unit 32i, respectively. And the additional yaw moment Mzθ is operated by the formula (9) below, and output to the torque value conversion unit 32k.

$$Mz\theta = Kv \cdot (-Kv \cdot v + Ky \cdot (d^2ye/dt^2) + K\theta \cdot \theta H) \qquad (9)$$

Figure 7:
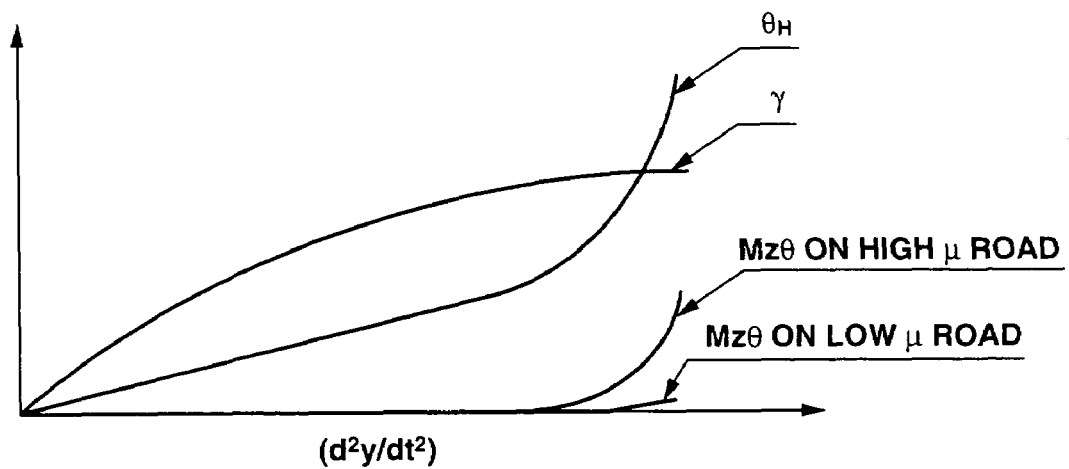
FIG. 7 is a representation of difference in the additional yaw moment between on the high μ road and the low μ road.

In other words, as shown in the formula (9), the term −Kv·v is the yaw moment sensing the yaw rate v, the term Kθ·θH is the yaw moment sensing the steering wheel angle θH, and the term Ky·(d²ye/dt²) is a correction value of the yaw moment. Therefore, as shown in FIG. 7, if the lateral acceleration (d²y/dt²) achieves a large motion on the high μ road, the additional yaw moment Mzθ also becomes a large value, and the maneuverability is improved. On the other hand, in the traveling on the low μroad, the above correction values are applied to the additional yaw moment Mzθ to reduce the additional yaw moment Mzθ, the turning property is not increased, and stable traveling performance can be obtained.

In the torque value conversion unit 32k, the steering wheel angle θH is input from the steering wheel angle sensor 22, and the additional yaw moment Mzθ is input from the additional yaw moment operational unit 32j, respectively. And the additional yaw moment Mzθ is converted into the torque value (the second transfer clutch torque T LSD2) by, for example, the formula (10), and output to the transfer clutch torque operational unit 33.

$$T\,LSD2 = Kc2 \cdot Mz\theta \qquad (10)$$

where, [+] is the left-turn direction, and [−] is the right-turn direction, and if the steering wheel angle θH is [+], Kc2 is set to be [−] value, and if the steering wheel angle θH is [−], Kc2 is set to be [+] value.

Figure 8:
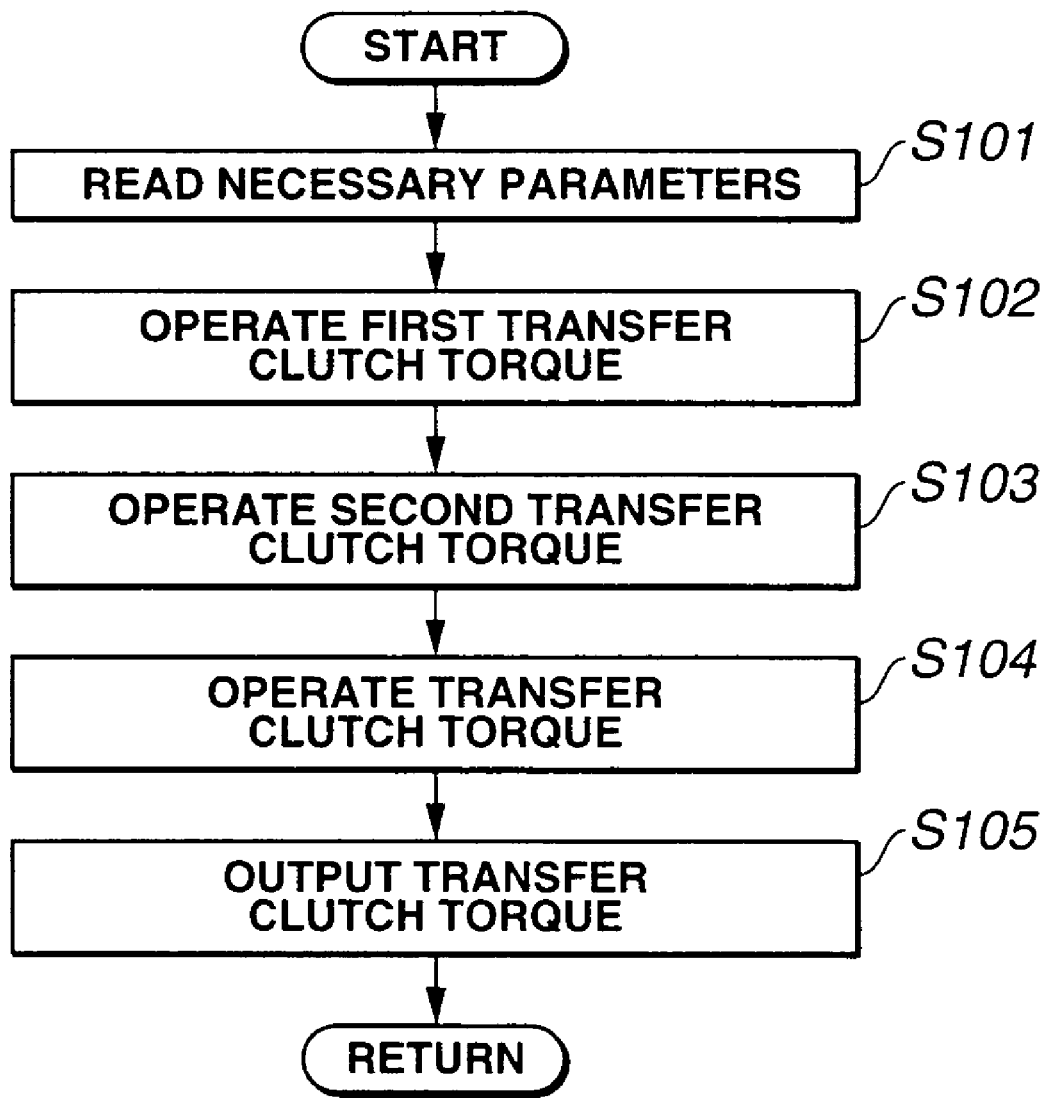
FIG. 8 is a flowchart of the transfer clutch control.

Next, the above transfer clutch control will be described following the flowchart in FIG. 8. Firstly, read the required parameters in Step (hereinafter, referred to as "S") 101, and advance to S102.

In S102, refer to the map according to the lateral acceleration (d²y/dt²) and the throttle opening θth, and set the first transfer clutch torque T LSD1.

Next, advance to S103, and operate the second transfer clutch torque T LSD2 following the second transfer clutch torque operation routine below.

Then, advance to S104, add the first transfer clutch torque T LSD1 to the second transfer clutch torque T LSD2 to operate the final transfer clutch torque T LSD (=T LSD1+T LSD2), advance to S105, output the transfer clutch torque T LSD, and exit the routine.

Figure 9:
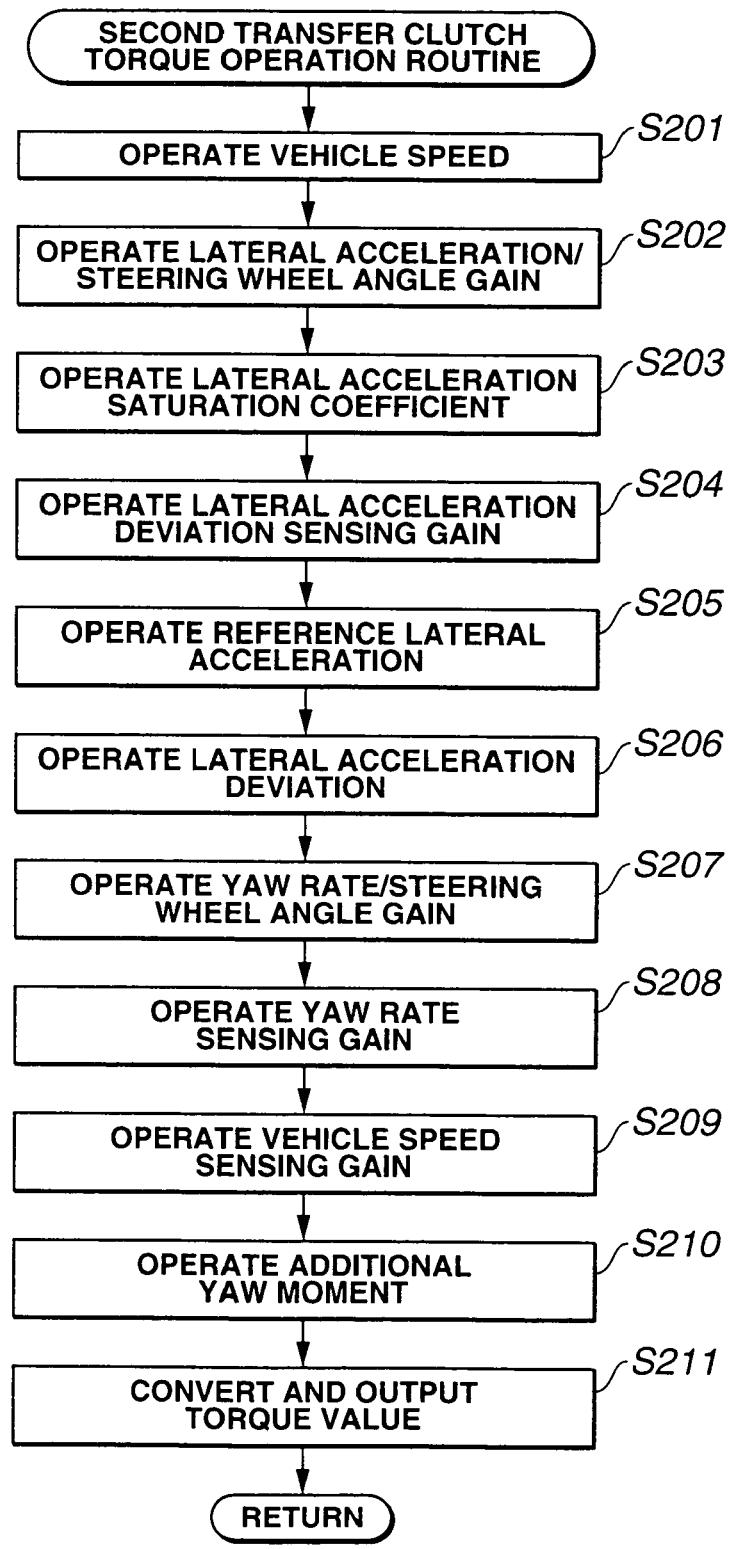
FIG. 9 is a flowchart of a second transfer clutch torque operation routine.

The routine for operating the second transfer clutch torque executed in S103 will be described with reference to the flowchart in FIG. 9. Firstly, operate the vehicle speed V in S201, and operate the lateral acceleration/steering wheel angle gain Gy by the above formula (1) in S202.

Next, advance to S203, refer to the preset map according to the value (Gy·θH) of the lateral acceleration/steering wheel angle gain Gy multiplied by the steering wheel angle θH and the lateral acceleration ($d^2y/dt^2$), and operate the lateral acceleration saturation coefficient Kμ.

Next, advance to S204, operate the lateral acceleration deviation sensing gain Ky by the above formula (2), advance to S205, and operate the reference lateral acceleration ($d^2yr/dt^2$) by the above formula (4).

Next, advance to S206, operate the lateral acceleration deviation ($d^2ye/dt^2$) by the above formula (6), advance to S207, operate the yaw rate/steering wheel angle gain Gv by the above formula (7), advance to S208, and operate the yaw rate sensing gain Kv by the above formula (8).

Next, advance to S209, operate the vehicle speed sensing gain Kv by the preset map, advance to S210, and operate the additional yaw moment Mzθ by the above formula (9).

Then, advance to S211, convert the additional yaw moment Mzθ to the torque value (the second transfer clutch torque T LSD2) by the above formula (10), output the second transfer clutch torque T LSD2 to the transfer clutch torque operational unit 33, and exit the routine.

As described above, according to the embodiment of the present invention, the additional yaw moment Mzθ is corrected by the term of Ky·($d^2ye/dt^2$) to be an optimum value to meet the actual drive. Thus, improvement of the maneuverability on the high μ road and the stability on the low μ road are compatible. Since this control is not performed by detecting the road friction μ, the control is excellent in responsiveness, and even abrupt change of road surfaces can be optimally coped with in excellent response.

Further, the embodiment of the present invention illustrates the front and rear power distribution control (the transfer clutch control) to variably control the driving force between front and rear wheels. However, the present embodiment can also be applied to the right and left driving force distribution control to variably control the driving force distribution between right and left wheels and the braking force control by applying the braking force to selected wheels.

In a case of the right and left driving force distribution control to variably control the driving force distribution between the right and left wheels, the transmission torque Tr between the right and left wheels may be set so as to be Tr=(½)·Mzθ·Rt/d (where, Rt is the tire diameter, and d is the tread).

Further, in a case of the braking force control by applying the braking force to selected wheels, a wheel to which the braking force is applied thereto is a turning inner rear wheel if the understeer of the vehicle is corrected, or a turning outer front wheel if the oversteer of the vehicle is corrected. And the braking force Bt to be applied may be controlled as Bt=Mzθ·Rt/d.

As described above, according to the present invention, not only the high μ road but also the low μ road, even abrupt change of road surfaces or the like can be optimally coped with in excellent response.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A vehicle motion control device comprising:
a lateral acceleration sensor that detects an actual lateral acceleration;
a controllable variable operational unit to calculate a value of a yaw moment required for controlling, and to calculate controllable variables including at least the yaw moment; and
a vehicle behavior control unit to control vehicle behaviors based on the controllable variables,
wherein the controllable variable operational unit calculates a reference lateral acceleration from at least a lateral acceleration to be operated, based on a linear vehicle motion model from a driving state of the vehicle and a preset coefficient according to the driving state of the vehicle, and uses a difference between the reference lateral acceleration and a detected actual lateral acceleration for a correction value of the value of the yaw moment.

2. The vehicle motion control device according to claim 1, wherein the value of the yaw moment comprises the value of the yaw moment according to at least a steering wheel angle.

3. The vehicle motion control device according to claim 1, wherein the value of the yaw moment comprises the value of the yaw moment according to at least a steering wheel angle and a value according to a yaw rate.

4. The vehicle motion control device according to claim 1, wherein the value of the yaw moment is limited according to a vehicle speed.

5. The vehicle motion control device according to claim 2, wherein the value of the yaw moment is limited according to a vehicle speed.

6. The vehicle motion control device according to claim 3, wherein the value of the yaw moment is limited according to a vehicle speed.

7. The vehicle motion control device according to claim 1, wherein the preset coefficient is set according to at least a steering wheel angle and the actual lateral acceleration.

8. The vehicle motion control device according to claim 2, wherein the preset coefficient is set according to at least the steering wheel angle and the actual lateral acceleration.

9. The vehicle motion control device according to claim 3, wherein the preset coefficient is set according to at least the steering wheel angle and the actual lateral acceleration.

10. The vehicle motion control device according to claim 4, wherein the preset coefficient is set according to at least a steering wheel angle and the actual lateral acceleration.

11. The vehicle motion control device according to claim 5, wherein the preset coefficient is set according to at least the steering wheel angle and the actual lateral acceleration.

12. The vehicle motion control device according to claim 6, wherein the preset coefficient is set according to at least the steering wheel angle and the actual lateral acceleration.

13. The vehicle motion control device according to claim 1, wherein the vehicle behavior control unit comprises at least one of a braking force control unit to control the braking force by applying the braking force to selected wheels, a front and rear driving force distribution control unit to variably control the driving force distribution between front and rear wheels, and a right and left driving force distribution control unit to variably control the driving force distribution between right and left wheels.

14. The vehicle motion control device according to claim 2, wherein the vehicle behavior control unit comprises at least one of a braking force control unit to control the braking force by applying the braking force to selected wheels, a front and rear driving force distribution control unit to variably control the driving force distribution between front and rear wheels, and a right and left driving force distribution control unit to variably control the driving force distribution between right and left wheels.

15. The vehicle motion control device according to claim 3, wherein the vehicle behavior control unit comprises at least one of a braking force control unit to control the braking force by applying the braking force to selected wheels, a front and rear driving force distribution control unit to variably control the driving force distribution between front and rear wheels, and a right and left driving force distribution control unit to variably control the driving force distribution between right and left wheels.

16. The vehicle motion control device according to claim 4, wherein the vehicle behavior control unit comprises at least one of a braking force control unit to control the braking force by applying the braking force to selected wheels, a front and rear driving force distribution control unit to variably control the driving force distribution between front and rear wheels, and a right and left driving force distribution control unit to variably control the driving force distribution between right and left wheels.

17. The vehicle motion control device according to claim 5, wherein the vehicle behavior control unit comprises at least one of a braking force control unit to control the braking force by applying the braking force to selected wheels, a front and rear driving force distribution control unit to variably control the driving force distribution between front and rear wheels, and a right and left driving force distribution control unit to variably control the driving force distribution between right and left wheels.

18. The vehicle motion control device according to claim 6, wherein the vehicle behavior control unit comprises at least one of a braking force control unit to control the braking force by applying the braking force to selected wheels, a front and rear driving force distribution control unit to variably control the driving force distribution between front and rear wheels, and a right and left driving force distribution control unit to variably control the driving force distribution between right and left wheels.

19. The vehicle motion control device according to claim 11, wherein the vehicle behavior control unit comprises at least one of a braking force control unit to control the braking force by applying the braking force to selected wheels, a front and rear driving force distribution control unit to variably control the driving force distribution between front and rear wheels, and a right and left driving force distribution control unit to variably control the driving force distribution between right and left wheels.

20. The vehicle motion control device according to claim 12, wherein the vehicle behavior control unit comprises at least one of a braking force control unit to control the braking force by applying the braking force to selected wheels, a front and rear driving force distribution control unit to variably control the driving force distribution between front and rear wheels, and a right and left driving force distribution control unit to variably control the driving force distribution between right and left wheels.

* * * * *